(12) United States Patent
Kasai

(10) Patent No.: US 8,163,382 B2
(45) Date of Patent: Apr. 24, 2012

(54) GLASS CERAMIC SELF-SUPPORTING FILM AND PROCESS FOR ITS PRODUCTION

(75) Inventor: Toshihiro Kasai, Kanagawa pref. (JP)

(73) Assignee: 3M Innovative Properties Company, Saint Paul, MN (US)

( * ) Notice: Subject to any disclaimer, the term of this patent is extended or adjusted under 35 U.S.C. 154(b) by 507 days.

(21) Appl. No.: 12/282,596

(22) PCT Filed: Mar. 26, 2007

(86) PCT No.: PCT/US2007/064910
§ 371 (c)(1),
(2), (4) Date: Sep. 11, 2008

(87) PCT Pub. No.: WO2007/112340
PCT Pub. Date: Oct. 4, 2007

(65) Prior Publication Data
US 2009/0061195 A1 Mar. 5, 2009

(30) Foreign Application Priority Data
Mar. 27, 2006 (JP) .................. 2006-085754

(51) Int. Cl.
B32B 5/16 (2006.01)
B32B 19/00 (2006.01)

(52) U.S. Cl. ........ 428/323; 428/325; 428/332; 428/402; 428/403; 428/404; 428/688; 428/689

(58) Field of Classification Search ............ 428/688, 428/689, 402, 403, 404, 323, 325, 332
See application file for complete search history.

(56) References Cited

U.S. PATENT DOCUMENTS

| 4,057,525 | A | | 11/1977 | Kikuchi et al. |
| 5,221,497 | A | | 6/1993 | Watanabe et al. |
| 5,849,375 | A | * | 12/1998 | Smith et al. ........... 428/34.5 |
| 5,858,280 | A | | 1/1999 | Zhang et al. |
| 5,885,713 | A | | 3/1999 | von Bonin et al. |
| 6,017,389 | A | | 1/2000 | Schmidt et al. |
| 6,221,942 | B1 | | 4/2001 | Boakye et al. |

(Continued)

FOREIGN PATENT DOCUMENTS
EP 1705027 9/2006
(Continued)

OTHER PUBLICATIONS http://www.grace.com/engineeredmaterials/materialsciences/colloidalsilica/default.aspx, 2011.*

(Continued)

Primary Examiner — Gwendolyn Blackwell
(74) Attorney, Agent, or Firm — Jean A. Lown

(57) ABSTRACT

A glass ceramic self-supporting film that includes silica ($SiO_2$) matrix glass and fine crystalline zirconia ($ZrO_2$) particles dispersed in the matrix glass. A process for production of a glass ceramic self-supporting film wherein the process includes the steps of combining a colloidal silica sol having a pH of 4 or less, a zirconium-containing compound and an organic binder to produce a mixture, coating the mixture onto a base material, drying the mixture on the coated base material to form a precursor film on the base material, releasing the precursor film from the base material, and firing the released precursor film.

4 Claims, 2 Drawing Sheets

U.S. PATENT DOCUMENTS

| | | |
|---|---|---|
| 6,682,598 B1 | 1/2004 | Steinmueller et al. |
| 7,064,094 B2 * | 6/2006 | Harada et al. .................... 501/54 |
| 2006/0112855 A1 | 6/2006 | Andersson et al. |
| 2006/0204655 A1 | 9/2006 | Takahashi |
| 2007/0128447 A1 * | 6/2007 | Hazel et al. .................... 428/426 |
| 2009/0090134 A1 | 4/2009 | Kasai |
| 2009/0098997 A1 | 4/2009 | Kasai |
| 2010/0147026 A1 | 6/2010 | Kasai |
| 2010/0189993 A1 | 7/2010 | Mori et al. |

FOREIGN PATENT DOCUMENTS

| | | |
|---|---|---|
| GB | 2077254 | 12/1981 |
| JP | 57077036 | 5/1982 |
| JP | 61083648 | 4/1986 |
| JP | 61-236619 | 10/1986 |
| JP | 04/154638 | 5/1992 |
| JP | 04-292425 | 10/1992 |
| JP | 08/290928 | 11/1996 |
| JP | 11/139837 | 5/1999 |
| JP | 04/284843 | 10/2004 |
| WO | WO 9733945 | 9/1997 |
| WO | WO 2007/115081 | 10/2007 |

OTHER PUBLICATIONS

Sumio Sakka, "Application of Sol-Gel Method", Agune-Syofusya Co. Ltd., Japan, Oct. 23, 1997.

Sakka, "Application of Sol-Gel Method", Agune-Syofusya Co. Ltd., Japan, Oct. 23, 1997.

* cited by examiner

GLASS CERAMIC SELF-SUPPORTING FILM AND PROCESS FOR ITS PRODUCTION

CROSS REFERENCE TO RELATED APPLICATIONS

This application is a national stage filing under 35 U.S.C. 371 of PCT/US2007/064910, filed Mar. 26, 2007, which claims priority to Japanese Application No. 2006-085754, filed Mar. 27, 2006, the disclosures of which are incorporated by reference in their entirety herein.

FIELD

Glass ceramic self-supporting films and processes for the production thereof are described.

BACKGROUND

Normal sol-gel processes utilize a metal oxide or hydroxide sol that is obtained from an inorganic compound solution, an organic metal compound solution of a metal alkoxide, or a similar compound. The sol is then gelled, and the gel is heated to produce a ceramic or glass.

Silica ($SiO_2$) glass production processes using sol-gel processes are known. Numerous examples are described by S. Sakka in the book *Sol Gel Science*, which was published by Agune Shofu Publishing. Most sol-gel processes are for the production of films less than 1 μm (micrometer) thick and use a metal alkoxide solution for integral formation on a base such as glass or a conductor. Although bulk type $SiO_2$ glass formed using a sol-gel process have been prepared separately and independently of a base, special drying machines (e.g., drying machines for supercritical drying) have been used to prevent the occurrences of cracks during the drying step. If the special drying equipment is not utilized, the drying must be carried out very slowly. For example, Japanese Unexamined Patent Publication SHO No. 61-236619 describes a production process for quartz glass using a sol-gel process. The drying method involves maintaining the film overnight at 20° C. and then using a container cover with a prescribed opening ratio for drying at 60° C. for 10 days. Similarly, Japanese Unexamined Patent Publication HEI No. 4-292425 describes a production process for silica glass using a sol-gel process. The starting sol is placed in a dish, gelled at room temperature, and then the cover of the dish is replaced with one containing holes for drying at 60° C. for 100 days. Such prolonged drying is considered a major obstacle for production via these methods.

Furthermore, bulk type $SiO_2$ glass produced by conventional sol-gel processes generally have a thickness of several tens of millimeters or greater. Methods for producing self-supporting glass films are therefore of interest.

SUMMARY

Self-supporting glass ceramic films as well as a sol-gel process for making the self-supporting glass films are described. The sol-gel process does not require prolonged drying.

In a first aspect, a self-supporting glass ceramic film is described. The glass ceramic self-supporting film comprises a $SiO_2$ matrix glass and fine crystalline zirconia ($ZrO_2$) particles dispersed in the matrix glass.

In a second aspect, a process for production of a glass ceramic self-supporting film is described. The process comprises the steps of combining (a) a colloidal silica sol having a pH of 4 or less, (b) a zirconium-containing compound, and (c) an organic binder to produce a mixture; applying the mixture onto a base material to form a coating; drying the coating on the base material to form a precursor film on the base material; releasing the precursor film from the base material; and firing the released precursor film.

DETAILED DESCRIPTION

Figure 1:
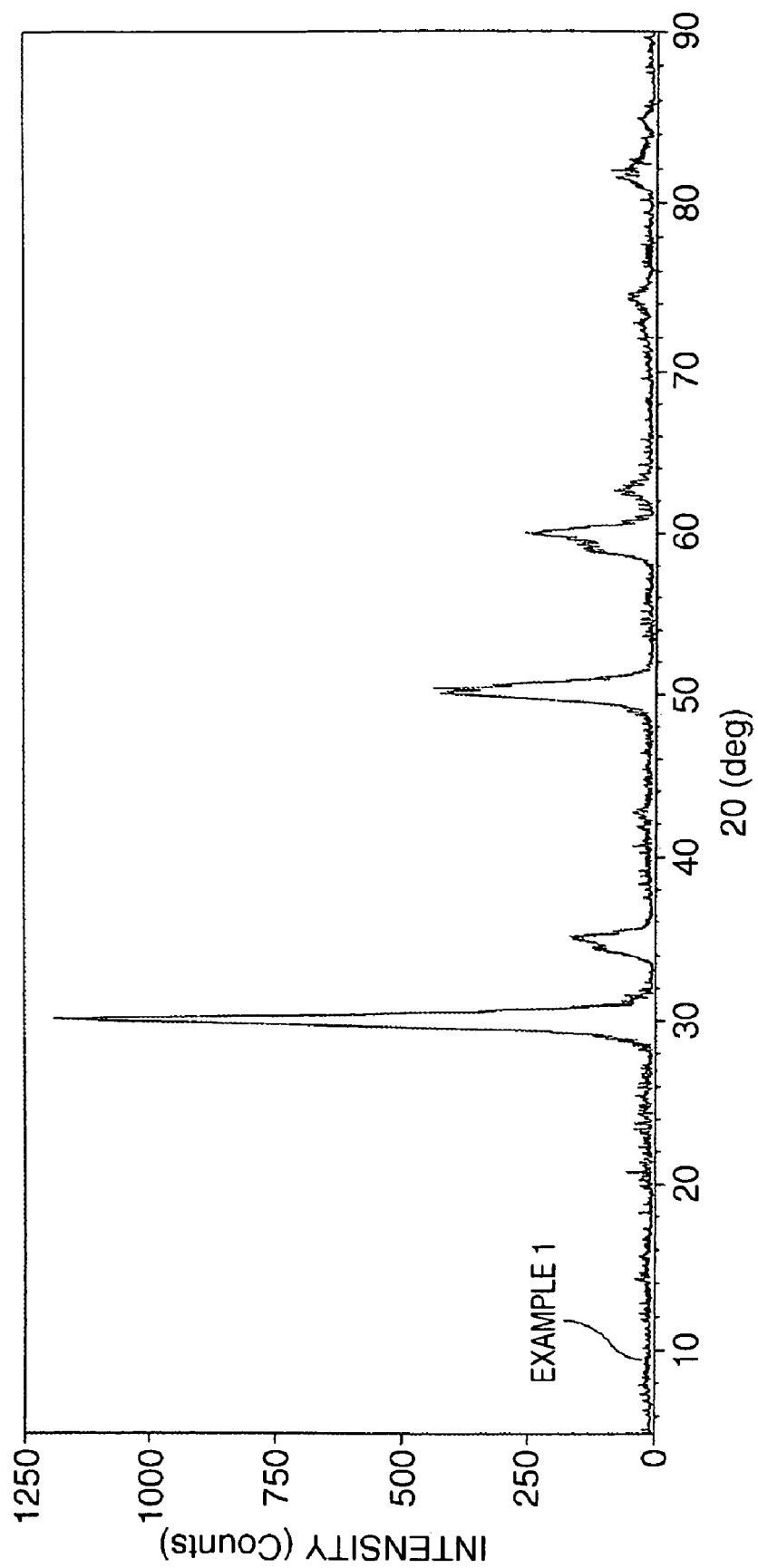
FIG. 1 is an X-ray diffraction (XRD) graph for the fired film of Example 1.
Figure 2:
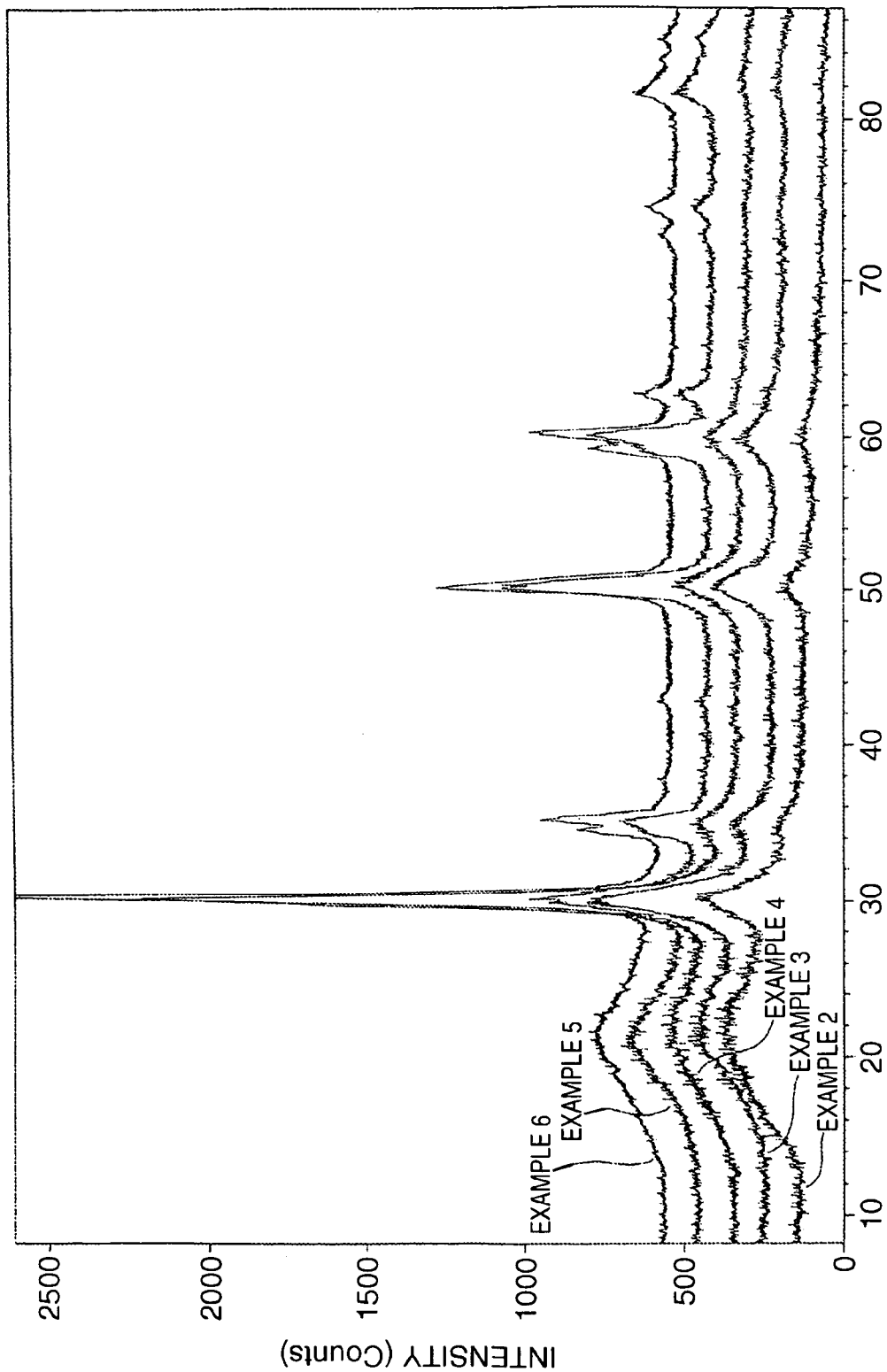
FIG. 2 shows the X-ray diffraction (XRD) graphs for the fired films of Examples 2-6.

Glass ceramic self-supporting films described herein include inorganic glass ceramic films that may exhibit weather resistance, heat resistance, corrosion resistance, or combinations thereof. Films formed as described herein may have enhanced scratch resistance because they contain $ZrO_2$ fine crystals. Furthermore, because the films are self-supporting, they can be flexible.

Processes disclosed herein utilize a dispersed mixture that contains a silica sol, a zirconium-containing compound, and an organic binder. The dispersion is obtained by adjusting the pH of the silica sol to 4 or less before the zirconium-containing compound is added. As a result, a crack-free transparent self-supporting film can be obtained. The production process can also allow the drying time to be shortened.

Glass ceramic self-supporting films described herein comprise a silica ($SiO_2$) matrix glass and fine crystalline $ZrO_2$ particles dispersed in the matrix glass. As used herein, a "self-supporting glass film" refers to a self-supporting thin film-like glass that requires no support. The thickness of the self-supporting glass film is typically no greater than about 2 millimeters (mm).

The glass ceramic self-supporting films are typically produced using a sol-gel process that is explained herein. The first step in the process prepares a mixture by combining a colloidal silica sol adjusted to be acidic, a zirconium-containing compound, and an organic binder.

Colloidal Silica Sol

Colloidal silica sols having silica fine particles dispersed stably in a dispersing medium can generally be utilized. Any kind of dispersing media typically used by one of skill in the art can be utilized herein. In some embodiments, water may be used as the dispersing medium to produce an aqueous silica sol. In other embodiments, the dispersing medium contains water and a water-miscible organic solvent.

In one embodiment, the average particle size of the colloidal silica sol is not greater than about 550 nm. In another embodiment, the average particle size is not greater than about 300 nm. In yet another embodiment, the average particle size is not greater than about 100 nm. A sol with excessively large silica fine particles can hamper formation of a transparent film. Furthermore, excessively large silica fine particles may also reduce the dispersion stability and result in non-uniformity in the glass ceramic film. A particle size which is excessively large can also cause the gaps between the particles to become so large that higher temperatures are needed for densification.

If the particle size is too small, cracks can occur more easily, and consequently it may tend to be difficult to form a self-supporting film. In one embodiment, the silica average particle size is at least about 4 nm. In another embodiment, the silica average particle size is at least about 8 nm.

Before the silica sol is mixed with a zirconium-containing compound, the pH of the silica sol is adjusted to a pH of 4 or less. In one embodiment, the pH is adjusted to a pH of 3 or less. If the pH of the silica sol is not 4 or less, the zirconium-containing compound can gel or precipitate. This may impair or prevent uniform dispersion of the zirconium in the silica sol.

In one embodiment, commercially available pre-acidified colloidal silica may be used. In another embodiment, a neutral or alkali colloidal silica may be utilized by adjusting the pH of the colloidal silica to 4 or less by adding an aqueous solution of ab acid. Acids that may be utilized include, but are not limited to, hydrochloric acid, nitric acid, and acetic acid before addition of the zirconium-containing compound. The relevant pH value is the pH of the colloidal silica solution just prior to addition of the zirconium-containing compound.

Zirconium-Containing Compound

The acidic colloidal silica sol is combined with a zirconium-containing compound. The zirconium-containing compound is typically a salt that is capable of forming fine crystals of zirconium oxide ($ZrO_2$) during firing. Any form of zirconia can be utilized, including but not limited to, zirconyl nitrate, zirconyl acetate, and combinations thereof. In one embodiment, zirconyl nitrate is utilized.

In one embodiment, the zirconium-containing compound may be directly combined as a solid form, such as a powder. In another embodiment, the zirconium-containing compound may be dissolved in water to form a solution that is combined with the silica sol.

The amount of the zirconium-containing compound that can be utilized is about 10-60 wt % based on the weight of $ZrO_2$ with respect to the weight of the silica-zirconium oxide ($SiO_2+ZrO_2$) glass ceramic self-supporting film. In another embodiment, the amount of the zirconium-containing compound is about 15-55 wt % based on the weight of $ZrO_2$ with respect to the weight of the silica-zirconium oxide ($SiO_2+ZrO_2$) glass ceramic self-supporting film. In yet another embodiment, the amount of the zirconium-containing compound is about 20-50 wt % based on the weight of $ZrO_2$ with respect to the weight of the silica-zirconium oxide ($SiO_2+ZrO_2$) glass ceramic self-supporting film.

If the amount of added $ZrO_2$ is too great, cracking may tend to occur during the drying step or during the firing step.

Organic Binder

The mixture includes an organic binder as well as the acidic colloidal silica sol and zirconium-containing compound. Any organic binders that are generally utilized by those of skill in the art may be utilized herein. Exemplary organic binders include, but are not limited to, water-soluble polymers such as polyvinyl alcohol, methylcellulose, hydroxypropylcellulose and polyvinylpyrrolidone. Excessive amounts of organic binder can generally improve the strength of the precursor film before the firing step, but can also tend to result in significant shrinkage. Significant shrinkage can be accompanied with the formation of cracks during the firing step. Excessive amounts of organic binder can also increase the production cost. Consequently, the amount of organic binder is generally low.

In one embodiment, the amount of organic binder added is not greater than about 100 wt % with respect to the weight of the obtained silica-zirconium oxide ($SiO_2+ZrO_2$) glass ceramic self-supporting film (i.e. the weight percentage with respect to the inorganic solid contents composed of silica and zirconium oxide). In another embodiment, the amount of organic binder added is not greater than about 80 wt % with respect to the weight of the obtained silica-zirconium oxide ($SiO_2+ZrO_2$) glass ceramic self-supporting film (i.e. the weight percentage with respect to the inorganic solid contents composed of silica and zirconium oxide). In another embodiment, the amount of organic binder added is not greater than about 50 wt % with respect to the weight of the obtained silica-zirconium oxide ($SiO_2+ZrO_2$) glass ceramic self-supporting film (i.e. the weight percentage with respect to the inorganic solid contents composed of silica and zirconium oxide).

Insufficient amounts of organic binder can result in insufficient precursor film strength and susceptibility of the film to tearing when releasing it from the base material. In one embodiment, the amount of organic binder that is added is generally about 2-100 wt % with respect to the inorganic solid contents composed of silica and zirconium oxide. In another embodiment, the amount of organic binder that is added is generally about 5-50% as the weight percentage with respect to the inorganic solid contents composed of silica and zirconium oxide.

Optional Additives

An organic solvent may optionally be included as an additive in the mixture. Organic solvents that may be used include, but are not limited to, alkanolamines such as triethanolamine, diethanolamine and monoethanolamine; γ-butyrolactone; lactic acid; polyhydric alcohols such as ethylene glycol, glycerin and 1,4-butanediol; polyhydric alcohol derivatives such as ethyleneglycol monopropylether; and combinations thereof. When the organic solvents are added, they are added in amounts not greater than about 5 wt % with respect to the weight of the resulting silica-zirconium oxide ($SiO_2+ZrO_2$) glass ceramic self-supporting film (i.e. the weight percentage with respect to the inorganic solid contents composed of silica and zirconium oxide). In another embodiment, an organic solvent or solvents can be added in an amount that is not greater than about 3 wt % with respect to the weight of the resulting silica-zirconium oxide ($SiO_2+ZrO_2$) glass ceramic self-supporting film (i.e. the weight percentage with respect to the inorganic solid contents composed of silica and zirconium oxide). When an organic solvent is optionally added, it can control the drying speed to prevent the precursor film from cracking. Additionally, an organic solvent may also confer flexibility to the precursor film and improve handling properties. An excessive amount of organic solvent however may notably delay drying of the film.

A surfactant may also be added to the mixture. A surfactant, when added can inhibit adhesion between the precursor film and the base material, thereby facilitating release of the precursor film from the base material. Generally, any surfactant known to those of skill in the art may be utilized. Specific surfactants that can be utilized include, but are not limited to, a polyoxyethylenealkylamine having satisfactory mixing stability with the silica sol.

Process Steps

The mixture, once prepared, is coated onto a base material. Base materials generally used by those of skill in the art can be utilized herein. Exemplary base materials include plastic films including, but not limited to, polyester films such as polyethylene terephthalate (PET), acrylic films such as polymethyl methacrylate (PMMA), polycarbonate films or polyimide films; glass; ceramic; and metal. The base material may optionally be subjected to release treatments such as silicone treatment to facilitate release of the precursor film after drying. In embodiments where a relatively thin film is to be formed, release treatment is generally not used because the treatment may reduce the film-forming properties of the mixture.

The method used for applying the mixture onto the base material can be any coating method known in the art such as, for example, die coating, spray coating, bar coating, knife coating, casting, spin coating, or printing methods such as screen printing.

After the mixture is applied onto the base material, the coating can be dried to form a precursor film. The drying may be carried out at room temperature (20° C. to 30° C.) or while heating. The drying may be done either at atmospheric pressure or under reduced pressure. Several hours of drying may be sufficient even when dried at room temperature. In one embodiment, drying may be continued for a full day.

After drying, the precursor film can be released from the base material. In one embodiment, the released precursor film can be cut to a desired size before firing.

The released precursor film is then subjected to firing. An electric furnace or other similar device may be used for firing. In one embodiment, the drying may be carried out in stages. In an initial stage, the temperature can slowly be raised at a heating of, for example, about 5° C./min. In another embodiment, a heating rate of about 3° C./min can be utilized. In yet another embodiment, a heating rate of about 1° C./min can be utilized. Generally, the temperature is raised until the organic compound reaches its burnout temperature (about 450° C. to 500° C.). The temperature typically is then further increased at a higher heating rate of, for example, about 5° C. to 10° C., up to the final firing temperature. The glass ceramic self-supporting film can be formed by firing the film for about 15 minutes or longer at the firing temperature. The firing temperature will usually be about 600° C. to 1300° C.

If the precursor film is not released before firing, the heat of firing can produce stress between the base material and precursor film, which can result in cracking.

The film-forming mixture comprising a colloidal silica sol, a zirconium-containing compound, and an organic binder is thought to provide resistance to cracking during drying and firing. The self-supporting film obtained by a process described herein contains fine crystalline $ZrO_2$ particles dispersed in $SiO_2$ matrix glass as confirmed by X-ray diffraction (XRD) analysis and transmission electron microscopy (TEM). XRD and TEM analysis have also revealed that the average particle size of the fine crystalline $ZrO_2$ particles is not greater than about 100 nm. A glass ceramic self-supporting film containing such fine crystalline $ZrO_2$ particles can generally have enhanced scratch resistance and can be transparent.

The thickness of the glass ceramic self-supporting film may be varied within a wide range. In one embodiment, films of about 5 μm to about 2 mm may be obtained using processes as described herein. In another embodiment, inorganic thin films with thicknesses of about 10-100 μm can be obtained that maintain adequate flexibility. The thickness of the film can be measured using a micrometer or by microscopic observation.

Self-supporting glass films formed herein may be attached to any substrate, including, but not limited to plastic films, metal, wood, concrete, or ceramic. Adding a glass film produced as disclosed herein on other materials can increase the heat resistance of the substrate, improve the scratch resistance of the substrate, improve the chemical resistance of the substrate, or combinations thereof. In one embodiment, gas barrier properties can be enhanced if a densified film is produced by forming the glass film under prescribed firing conditions. In another embodiment, heat insulating properties can be provided if the glass film is formed without thorough densification.

In some embodiments, glass films may be used by attaching them to plastic films. Such articles can be used, for example, in display devices such as plasma display panels (PDP) or liquid crystal display panels (LCP). Additionally, such articles can be used as lightweight structural materials for windows and the like.

EXAMPLES

The disclosure is further described below by referring to Examples, but the disclosure is of course not limited by these Examples.

Example 1

Snowtex ST-O (Nissan Chemical Co., Ltd.—particle size: 10-20 nm, solid content: 20.5 wt %) with a pH of approximately 2.8 was used as a colloidal silica sol. The pH of the Snowtex ST-O was measured using a commercially available portable pH probe (trade name: "Checker 1" by Hana Instruments). About 20 to 30 mL of the sample was placed in a separate container to measure the pH.

A 1.0 gram portion of zirconyl nitrate dihydrate (Wako Pure Chemical Industries Co., Ltd.) was dissolved in 1.9 grams of distilled water. The resulting zirconyl nitrate solution was mixed with 5.3 grams of the Snowtex ST-O colloidal silica sol.

Separately, polyvinyl alcohol (KURARAY POVAL PVA-105—Kuraray Co., Ltd.), an organic binder, was dissolved in distilled water to prepare a 5 wt % polyvinyl alcohol solution.

Also, 0.6 grams of 2-aminoethanol (Wako Pure Chemical Industries Co., Ltd.) was dissolved in 1.8 grams of water and the solution was neutralized by the slow addition of 1.8 grams of acetic acid (Wako Pure Chemical Industries Co., Ltd.) to prepare an aminoethanol solution.

0.1 grams of AMIET 105 (Kao Corp.), a surfactant, 0.2 grams of the aminoethanol solution, and then 4.8 grams of the previously prepared zirconyl nitrate-containing silica sol were added to 6 grams of the 5 wt % polyvinyl alcohol solution to produce a mixture.

The mixture was cast onto a silicone-treated polyethylene terephthalate (PET) film (Toray Corp.—LUMILAR) and dried overnight at room temperature. The dried precursor film was released from the PET film and fired on an alumina base in an electric furnace. The firing was performed by slowly raising the temperature from room temperature to 500° C. over a period of 3 hours (heating rate: 2.65° C./min) to remove the organic binder. The temperature was then raised to 1200° C. over a period of one hour (heating rate: 12° C./min) and firing was continued for about 30 minutes at 1200° C.

A transparent glass ceramic self-supporting film was obtained. The thickness at several locations of the film was measured with a micrometer, and was found to be about 50 μm. X-ray diffraction (XRD) analysis confirmed that the transparent fired sample contained t-$ZrO_2$ (tetrahedral zirconia) fine crystals. More specifically, the self-supporting glass film was confirmed to have a structure with fine crystalline $ZrO_2$ a in $SiO_2$ matrix glass. Direct observation of a TEM image revealed t-$ZrO_2$ average particle sizes of 5 to 10 nm. The film was flexible such that it could be bent when pressed by a finger. FIG. 1 shows the results of XRD after firing at 1200° C.

Examples 2-6

Self-supporting glass films were produced similar to Example 1, except that the final firing temperature was changed as shown in Table 1. Table 1 also shows the fine crystal average particle sizes and film thicknesses calculated in the same manner as Example 1.

TABLE 1

| Ex. No. | pH of colloidal silica sol | Firing temperature | Post-firing appearance | XRD results (zirconia fine crystals) | $ZrO_2$ particle size | Film thickness |
|---|---|---|---|---|---|---|
| 1 | 2.8 | 1200° C. | transparent film | t-$ZrO_2$ | 5-10 nm | 50 μm |
| 2 | 2.8 | 600° C. | transparent film | t-$ZrO_2$ | <5 nm | 80 μm |
| 3 | 2.8 | 800° C. | transparent film | t-$ZrO_2$ | <5 nm | 70 μm |
| 4 | 2.8 | 1000° C. | transparent film | t-$ZrO_2$ | 5-8 nm | 70 μm |
| 5 | 2.8 | 1200° C. | transparent film | t-$ZrO_2$ | 5-10 nm | 60 μm |
| 6 | 2.8 | 1300° C. | transparent film | t-$ZrO_2$ | 5-15 nm | 60 μm |

As shown in Table 1, each example yielded a transparent self-supporting film after firing. In addition, all of the samples exhibited flexibility sufficient to be bent when pressed by a finger. FIGS. 2a-2e show the XRD results for the fired films.

Example 7

A self-supporting film was produced similar to Example 1, except instead of polyvinyl alcohol, a 2 wt % aqueous solution of hydroxypropylmethylcellulose (TC-5—Shinetsu Chemical Co., Ltd.) was used as the organic binder. The fired self-supporting film was transparent and had flexibility sufficient to be bent when pressed by a finger. Using methods similar to those utilized in Example 1 and XRD, it was determined that the fine crystal average particle sizes were 5-10 nm and the film thickness was about 50 μm.

Example 8

A self-supporting film was produced similar to Example 1, except instead of polyvinyl alcohol, a 2 wt % aqueous solution methylcellulose (25 cP-Wako Pure Chemical Industries Co., Ltd.) was used as the organic binder. The fired film was transparent and had flexibility sufficient to be bent when pressed by a finger. Using methods similar to those utilized in Example 1 and XRD, it was determined that the fine crystal average particle sizes were 5-10 nm and the film thickness was 60 μm.

Example 9

A self-supporting film was produced similar to Example 1, except Snowtex ST-OS (particle size: 8-11 nm, solid content: 20.5 wt %) was used instead of Snowtex ST-O as the colloidal silica sol. The pH of the colloidal silica sol measured in the same manner as Example 1 was 2.8. The fired film was transparent and had flexibility sufficient to be bent when pressed by a finger. Using methods similar to those utilized in Example 1 and XRD, it was determined that the fine crystal average particle sizes were 5-10 nm and the film thickness was 50 μm.

Example 10

A self-supporting film was produced similar to Example 1, except Snowtex ST-O40 (particle size: 20-30 nm, solid content: 40.8 wt %) was used instead of Snowtex ST-O as the colloidal silica sol. The fired film was transparent and had flexibility sufficient to be bent when pressed by a finger. Using methods similar to those utilized in Example 1 and XRD, it was determined that the fine crystal average particle sizes were 5-10 nm and the film thickness was 60 μm.

Examples 11-13

Self-supporting films were produced similar to Example 1, except as shown in Table 2 below, Snowtex ST-O40 (particle size: 20-30 nm, solid content: 40.8 wt %) and Snowtex ST-OXS (particle size: 4-6 nm, solid content: 10.5 wt %) were used as silica gels instead of Snowtex ST-O. The fired films were transparent and had flexibility sufficient to be bent when pressed by a finger. Table 2 shows the fine crystal average particle sizes and film thicknesses determined by methods similar to Example 1 and XRD results.

TABLE 2

| Ex. No. | Colloidal silica sol composition ST-040:ST-OXS | pH of the colloidal silica sol | Post-firing appearance | XRD results (zirconia fine crystals) | $ZrO_2$ particle size | Thickness |
|---|---|---|---|---|---|---|
| 11 | 70:30 | 2.8 | transparent film | t-$ZrO_2$ | 5-10 nm | 50 μm |
| 12 | 60:40 | 2.8 | transparent film | t-$ZrO_2$ | 5-10 nm | 60 μm |
| 13 | 40:60 | 2.8 | transparent film | t-$ZrO_2$ | 5-10 nm | 60 μm |

Examples 14-18

Self-supporting films were produced similar to Example 1, except that the amount of zirconyl nitrate was changed as shown in Table 3. Table 3 also shows the fine crystal average particle sizes and film thicknesses determined by methods similar to Example 1 and XRD results.

TABLE 3

| Ex. No. | $ZrO_2$ content with respect to $SiO_2 + ZrO_2$ | pH of the colloidal silica sol | Post-firing appearance | XRD results (zirconia fine crystals) | $ZrO_2$ particle size | Thickness |
|---|---|---|---|---|---|---|
| 14 | 10% | 2.8 | transparent film | t-$ZrO_2$ | 5-10 nm | 70 μm |
| 15 | 20% | 2.8 | transparent film | t-$ZrO_2$ | 5-10 nm | 80 μm |
| 16 | 40% | 2.8 | transparent film | t-$ZrO_2$ | 5-10 nm | 60 μm |
| 17 | 50% | 2.8 | transparent film | t-$ZrO_2$ | 5-10 nm | 50 μm |
| 18 | 60% | 2.8 | opaque film | t-$ZrO_2$ | 5-10 nm | 50 μm |

Example 19

A self-supporting film was produced similar to Example 1, except that zirconyl acetate (Sockawa Chemical Co., Ltd.) was used instead of zirconyl nitrate. As shown in Table 4, the fired film was also transparent and had flexibility sufficient to be bent when pressed by a finger. Using methods similar to those utilized in Example 1 and XRD, it was determined that the fine crystal average particle sizes were 5-10 nm and the film thickness was 50 μm.

TABLE 4

| Ex. No. | Zirconyl compound | pH of the colloidal silica sol | Post-firing appearance | XRD results (zirconia fine crystals) | ZrO$_2$ particle size | Thickness |
|---|---|---|---|---|---|---|
| 19 | Zirconyl acetate | 2.8 | transparent film | t-ZrO$_2$ | 5-10 nm | 50 μm |

Examples 20-27

Self-supporting films were produced similar to Example 1, except that the organic solvents listed in Table 5 below were used instead of the 2-aminoethanol mixed with acetic acid. All of the fired films were transparent and had flexibility sufficient to be bent when pressed by a finger.

TABLE 5

| Ex. No. | Organic solvent | pH of the colloidal silica sol | Post-firing appearance | XRD results (zirconia fine crystals) | ZrO$_2$ particle size | Thickness |
|---|---|---|---|---|---|---|
| 20 | Lactic acid | 2.8 | transparent film | t-ZrO$_2$ | 5-10 nm | 80 μm |
| 21 | 1,4-Butanediol | 2.8 | transparent film | t-ZrO$_2$ | 5-10 nm | 60 μm |
| 22 | γ-Butyrolactone | 2.8 | transparent film | t-ZrO$_2$ | 5-10 nm | 70 μm |
| 23 | Ethylene glycol | 2.8 | transparent film | t-ZrO$_2$ | 5-10 nm | 50 μm |
| 24 | Glycerin | 2.8 | transparent film | t-ZrO$_2$ | 5-10 nm | 60 μm |
| 25 | Poly(ethylene glycol) methylether M$_n$ 350 | 2.8 | transparent film | t-ZrO$_2$ | 5-10 nm | 40 μm |
| 26 | Diethanol amine (mixed with acetic acid) | 2.8 | transparent film | t-ZrO$_2$ | 5-10 nm | 60 μm |
| 27 | Triethanol amine (mixed with acetic acid) | 2.8 | transparent film | t-ZrO$_2$ | 5-10 nm | 70 μm |

Comparative Example 1

A self-supporting film was produced similar to Example 1 except, the silica sol used was Snowtex ST-C (Nissan Chemical Co., Ltd.—particle size: 10-20 nm, solid content: 20.5 wt %, pH 8.6) instead of Snowtex ST-O. When a solution of zirconyl nitrate dihydrate (Wako Pure Chemical Industries Co., Ltd.) in distilled water was mixed with the sol, a precipitate was produced and a sol mixture could not be formed.

Comparative Examples 2 and 3

Self-supporting films were produced similar to Example 1, except that the final firing temperature was changed as shown in Table 6.

TABLE 6

| Comp. Ex. | pH of the collodial silica sol | Firing temperature | Post-firing appearance | Thickness |
|---|---|---|---|---|
| 1 | 8.6 | — | — | — |
| 2 | 2.8 | 400° C. | brown film | 100 μm |
| 3 | 2.8 | 500° C. | yellow film | 90 μm |

As shown in Table 6, coloration by residual carbon was observed at firing temperatures of 400° C. and 500° C.

The invention claimed is:

1. A glass ceramic self-supporting film comprising:
   silica (SiO$_2$) matrix glass; and
   fine crystalline zirconia (ZrO$_2$) particles dispersed in the matrix glass, wherein the amount of fine crystalline zirconia particles is in an amount in a range of 10 to 60 weight percent based on a weight of SiO$_2$ and ZrO$_2$ in the glass ceramic self-supporting film,
   wherein the glass ceramic self-supporting film has a thickness no greater than 2 millimeters, is flexible, and is crack-free.

2. A glass ceramic self-supporting film according to claim 1, wherein the fine crystalline zirconia (ZrO$_2$) particles have an average particle size that is not greater than about 100 nm.

3. A glass ceramic self-supporting film according to claim 1, wherein the thickness of the glass ceramic self-supporting film is about 10 μm to about 100 μm.

4. A glass ceramic self-supporting film according to claim 1, wherein the silica matrix is formed from a silica sol having an average particle size no greater than 550 nanometers.

* * * * *

UNITED STATES PATENT AND TRADEMARK OFFICE
CERTIFICATE OF CORRECTION

| | |
|---|---|
| PATENT NO. | : 8,163,382 B2 |
| APPLICATION NO. | : 12/282596 |
| DATED | : April 24, 2012 |
| INVENTOR(S) | : Toshihiro Kasai |

It is certified that error appears in the above-identified patent and that said Letters Patent is hereby corrected as shown below:

<u>Column 8</u>
Line 61, delete "(Sockawa" and insert -- (Soekawa --, therefor.

<u>Column 10</u>
Line 15, delete "collodial" and insert -- colloidal --, therefor.

Signed and Sealed this
Thirty-first Day of July, 2012

David J. Kappos
*Director of the United States Patent and Trademark Office*